US008458720B2

(12) United States Patent
Bansal et al.

(10) Patent No.: US 8,458,720 B2
(45) Date of Patent: Jun. 4, 2013

(54) METHODS AND SYSTEMS FOR ASSIGNING NON-CONTINUAL JOBS TO CANDIDATE PROCESSING NODES IN A STREAM-ORIENTED COMPUTER SYSTEM

(75) Inventors: Nikhil Bansal, Yorktown Heights, NY (US); Kirsten Weale Hildrum, Hawthorne, NY (US); Deepak Rajan, Fishkill, NY (US); Joel Leonard Wolf, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 1249 days.

(21) Appl. No.: 11/840,556

(22) Filed: Aug. 17, 2007

(65) Prior Publication Data

US 2009/0300623 A1 Dec. 3, 2009

(51) Int. Cl.
*G06F 9/46* (2006.01)

(52) U.S. Cl.
USPC .......................... 718/107; 718/103; 718/104

(58) Field of Classification Search
USPC .............................................. 718/107
See application file for complete search history.

(56) References Cited

U.S. PATENT DOCUMENTS

| | | | | |
|---|---|---|---|---|
| 6,678,065 B1* | 1/2004 | Hikawa | ..................... | 358/1.13 |
| 6,876,894 B1* | 4/2005 | Chen et al. | ..................... | 700/100 |
| 7,058,951 B2* | 6/2006 | Bril et al. | ..................... | 718/104 |
| 7,061,869 B2* | 6/2006 | Luss et al. | ..................... | 370/238 |
| 7,165,252 B1* | 1/2007 | Xu | ..................... | 718/102 |
| 7,748,005 B2* | 6/2010 | Romero et al. | ..................... | 718/104 |
| 2003/0061260 A1* | 3/2003 | Rajkumar | ..................... | 709/104 |
| 2004/0260796 A1* | 12/2004 | Sundqvist et al. | ..................... | 709/223 |
| 2005/0165881 A1* | 7/2005 | Brooks et al. | ..................... | 709/200 |
| 2005/0172291 A1* | 8/2005 | Das et al. | ..................... | 718/104 |
| 2005/0289072 A1* | 12/2005 | Sabharwal | ..................... | 705/59 |
| 2006/0026212 A1* | 2/2006 | Tsukerman et al. | ..................... | 707/200 |

OTHER PUBLICATIONS

Hoitomt et al., "A Practical Approach to Job-Shop Scheduling Problems," IEEE Transactions on Robotics and Automation, vol. 9, No. 1, Feb. 1993.*
Ma et al., "A Task Allocation Model for Distributed Computing Systems," IEEE Transactions on Computers, vol. C-31, No. 1, Jan. 1982.*
Wang et al., "An effective hybrid optimization strategy for job-shop scheduling problems," Computer & Operations Research vol. 28, Issue 6, May 2001, pp. 585-596.*

(Continued)

*Primary Examiner* — Lewis A Bullock, Jr.
*Assistant Examiner* — Kevin X Lu
(74) *Attorney, Agent, or Firm* — Tutunjian & Bitetto, P.C.; William Stock

(57) ABSTRACT

A system and method for choosing non-continual jobs to run in a stream-based distributed computer system includes determining a total amount of resources to be consumed by non-continual jobs. A priority threshold is determined above which jobs will be accepted, below which jobs will be rejected. Overall penalties are minimized relative to the priority threshold based on estimated completion times of the jobs. System constraints are applied to ensure that jobs meet set criteria such that a plurality of non-continual jobs are scheduled which consider the system constraints and minimize overall penalties using available resources.

18 Claims, 14 Drawing Sheets

OTHER PUBLICATIONS

Wu et al., "Streaming video over the Internet: approaches and directions," IEEE Transactions on Circuits and Systems for Video Technology, Mar. 2001.*

T. Ibaraki et al., : Resource Allocation Problems, Algorithmic Approaches, The MIT Press, London, England; 1988 (2 pages).

D. Bertsimas et al., Introduction to Linear Optimization, Athena Scientific, Belmont, MA; 1997 (2 pages).

Cormen et al., "Introduction to ALgorithms", The MIT Press; Cambridge, MA; sixth printing, 1992. (2 pages).

Ravindra K. Ahuja et al., "Network Flows, Theory, Algorithms, and Applications", Prentice Hall, Englewood Cliffs, NJ; 1993. (2 pages).

Bansal, et al., Method and Apparatus for Scheduling Work in A Stream-Oriented Computer System; Unpublished U.S. Appl. No. 11/374,192, filed Mar. 13, 2006; 50 pages.

Bansal, et al., Method and Apparatus for Assigning Fractional Processing Nodes to Work in a Stream-Oriented Computer System; Unpublished U.S. Appl. No. 11/374,643, filed Mar. 13, 2006; 70 pages.

Bansal, et al., Method and Apparatus for Assigning Candidate Processing Nodes in a Stream-Oriented Computer System; Unpublished U.S. Appl. No. 11/374,399, filed Mar. 13, 2006; 76 pages.

* cited by examiner

METHODS AND SYSTEMS FOR ASSIGNING NON-CONTINUAL JOBS TO CANDIDATE PROCESSING NODES IN A STREAM-ORIENTED COMPUTER SYSTEM

GOVERNMENT RIGHTS

This invention was made with Government support under Contract No.: H98230-05-3-0001 awarded by Intelligence Agencies. The Government has certain rights in this invention.

BACKGROUND

1. Technical Field

The present invention relates generally to scheduling non-continual work in a stream-based distributed computer system, and more particularly, to systems and methods for resource allocation to provision for non-continual jobs, for deciding which non-continual jobs to perform, for deciding when to perform these jobs, for determining how much processing to allocate to each of selected jobs, and for deciding how to choose candidate processing nodes for the processing elements in those jobs in a manner which minimizes a penalty of the non-continual work in the system, results in good network utilization, meets a variety of practical constraints, and is robust with respect to dynamic changes in the system over time.

2. Description of the Related Art

Distributed computer systems designed specifically to handle very large-scale stream processing jobs are in their infancy. Several early examples augment relational databases with streaming operations. Distributed stream processing systems are likely to become very common in the relatively near future, and are expected to be employed in highly scalable distributed computer systems to handle complex jobs involving enormous quantities of streaming data.

In particular, systems including tens of thousands of processing nodes able to concurrently support hundreds of thousands of incoming and derived streams may be employed. These systems may have storage subsystems with a capacity of multiple petabytes. Even at these sizes, streaming systems are expected to be essentially swamped at almost all times. Processors will be nearly fully utilized, and the offered load (in terms of jobs) will far exceed the prodigious processing power capabilities of the systems, and the storage subsystems will be virtually full. Such goals make the design of future systems enormously challenging.

Any stream-oriented system will have a reasonable amount of non-continual work, and this work will need to be scheduled in parallel with the continual (streaming) jobs. Examples of such non-continual jobs include, but are not limited to, maintenance tasks, performance optimization tasks, and other traditional work. Focusing on the scheduling of non-continual work in such a streaming system, it is clear that an effective optimization method is needed to use the system properly.

Consider the complexity of the scheduling problem as follows. Referring to FIG. 1, a conceptual system is depicted for scheduling typical jobs. Each job 1-6 includes directed graphs 12 with nodes 14 and directed arcs 16. The nodes 14 correspond to tasks (which may be called processing elements, or PEs), interconnected by directed arcs 16 (which represent the precedence constraints among the PEs). Assume that the jobs themselves are not interconnected; this can be done without loss of generality by aggregating jobs.

Referring to FIG. 2, a typical distributed computer system 11 is shown. Processing nodes 13 (or PNs) are interconnected by a network 19. One problem includes the scheduling of non-continual work in a stream-oriented computer system in a manner which minimizes the penalty of the non-continual work performed. The problem also includes the process of deciding how many resources to allocate to non-continual work, as compared to the streaming work. The various processing elements do the work in the system, and may have arbitrarily complex precedence constraints among themselves. The system is typically overloaded and can include many processing nodes. Importance of the various work items can change frequently and dramatically. There are no known solutions to this problem.

SUMMARY

A scheduler in accordance with the present principles performs at least one of the following functions: (1) decides resources to allocate to the non-continual jobs in a system; (2) decides which of these jobs to perform in the system; (3) decides when to process each chosen job; (4) decides, for each such performed job, how many resources to allocate to each processing element (PE) in the job; (5) fractionally assigns the PEs in those jobs to the processing nodes (PNs). In other words, the scheduler decides when to process the PEs of the performed jobs; overlays the PEs of the performed jobs onto the PNs of the computer system; and attempts to minimize a measure of the penalty of the non-continual jobs performed.

The following practical issues make it difficult for a scheduler to provide this functionality effectively. First, the offered load may exceed the system capacity by large amounts. Thus, all system components, including the PNs, should be made to run at nearly full capacity nearly all the time. A lack of spare capacity means that there is no room for error, both in the decision of how much processing to reserve for non-continual jobs in a stream-based system, and in the decision of deciding which of the non-continual jobs to perform.

Second, non-continual jobs have a real-time time scale, often with penalties that increase significantly with increasing completion time. Often, only one shot is available to minimize the penalty of the performed job, so the correct decision should be made on which jobs to run. There are multiple non-continual jobs where numerous PEs are interconnected in complex, changeable configurations (in terms of their precedence constraints). Since the time to process a non-continual PE depends on the processing given to it, if scheduling is not done precisely, this can lead to job execution overflows (and increase in penalties), or to under-utilization of resources (idle times).

Third, the capability of dynamic re-balancing of resources for jobs is needed because the importance of the output they produce changes frequently and dramatically. For example, discoveries, new and departing queries and the like can cause major shifts in resource allocation. These changes are to be made quickly. Jobs may come and go unpredictably.

Fourth, there will be lots of special and critical requirements on the scheduler, for example, priority, resource matching, licensing, security, privacy, uniformity, temporal, fixed point and incremental constraints. Fifth, given a system running at near capacity, it is even more important than usual to optimize the proximity of the interconnected PE pairs (those that are connected by precedence constraints) as well as the distance between PEs and storage. Thus, for example, logically close PEs should be assigned to physically close PNs.

These competing difficulties make the finding of high quality schedules very daunting. There is presently no known prior art describing schedulers meeting these design objectives. It will be apparent to those skilled in the art that no simple heuristic scheduling method will work satisfactorily for stream-based computer systems of this kind. There are simply too many different aspects that need to be balanced against each other. Accordingly, aspects of a three-level hierarchical method which creates high quality schedules in a distributed stream-based environment will be described. The hierarchy is temporal in nature. As the level in the hierarchy increases, the difficulty in solving the problem also increases. However, more time to solve the problem is provided as well. Furthermore, the solution to a higher level problem makes the next lower level problem more manageable. The three levels, from top to bottom, may be referred to for simplicity as the macro, micro and nano models respectively. The micro and nano models are provided to solve the same problem for both continual and non-continual jobs, as will be described.

Hierarchically organized methods, which, taken together, provide the full functionality as described above. The present invention describes, in particular, the macro model for non-continual jobs. The non-continual macro model decides the amount of resources to provision for non-continual jobs, creates a list of jobs that will be performed, a list of the times at which the PEs in the jobs will be processed, a list of the amount of resources to allocate to each PE in the job, and a list of candidate processing nodes (PNs) for each of the processing elements (PEs).

The present invention is an epoch-based method for reserving resources for non-continual jobs, choosing jobs, making PE execution time and processing decisions and creating a list of candidate processing nodes (PNs) for each of the processing elements (PEs) in a distributed stream-oriented computer system. The method is given a metric describing the penalties of the non-continual jobs, job priorities, precedence constraints among the PEs in each job, and also security, licensing, resource matching and other rules for what constitutes an acceptable set of candidate PNs for a PE, as well as a description of the current candidate nodes, a list of those candidate nodes which cannot be modified from their current values, and rules for the maximum amount of change permitted to these candidate nodes. The time unit for the method is a macro epoch, e.g., on order of a half hour.

The present invention also describes a resource partitioner model that, every macro epoch, partitions the resources among continual and non-continual jobs by comparing their contributions to the net importance in the system. In one embodiment, an apparatus and method for making candidate node assignments of processing elements to processing nodes for stream-based applications in a distributed computer system includes partitioning the system's resources among non-continual and continual jobs, determining the amount of processing power to give to each processing element, and determining when to execute each processing element. To update the job choices, job execution times, allocations of processing power and the candidate nodes, the process is repeated every macro epoch.

A method of choosing non-continual jobs to run in a stream based distributed computer system includes determining jobs to be run in a distributed stream-oriented system by deciding a priority threshold above which jobs will be accepted, below which jobs will be rejected, minimizing overall penalty relative to the priority threshold based on penalty values assigned to all non-continual jobs and applying system constraints to ensure jobs meet set criteria.

Another method of choosing non-continual jobs to run in a stream based distributed computer system includes determining jobs to be run in a distributed stream-oriented system in accordance with a priority threshold above which jobs will be accepted, below which jobs will be rejected, to minimize projected penalty by deciding which jobs to run and how much resources to allocate to the running jobs, and allocating appropriate processing power to processing elements in the running jobs.

An apparatus for scheduling stream-based applications in a distributed computer system includes a scheduler configured to schedule non-continual work using a macro method configured to determine jobs to be run in a distributed stream-oriented system in accordance with a priority threshold above which jobs will be accepted, below which jobs will be rejected, to minimize projected penalty. The non-continual macro method includes a "quantity" component configured to minimize penalty by deciding which jobs to run, when to execute the jobs, and how much resources to allocate to the PEs in the running jobs. The macro method includes a "where" component configured to allocate appropriate processing power (from the processing nodes) to processing elements in the running jobs.

A method of choosing non-continual jobs to run in a distributed stream-oriented system includes partitioning the resources in the system among continual and non-continual jobs by comparing the contribution to system importance from each category of jobs, and dynamically updating this partitioning every macro time epoch based on a variety of factors, which may include the marginal improvement in importance of the continual and non-continual work as a function of the resources allocated in the previous epoch.

Another method of choosing non-continual jobs to run in a stream based distributed computer system includes partitioning the resources in the system among continual and non-continual jobs by comparing the contribution to system importance from each category of jobs, and dynamically updating this partitioning every macro time epoch based on a variety of factors, which may include the marginal improvement in importance of the continual and non-continual work as a function of the resources allocated in a previous epoch.

An apparatus for scheduling stream-based applications in a distributed computer system includes a scheduler configured to schedule non-continual work using a method configured to partition the resources in the system among continual and non-continual jobs by comparing the contribution to system importance from each category of jobs, and dynamically updating this partitioning every macro time epoch based on a variety of factors, which may include the marginal improvement in importance of the continual and non-continual work as a function of the resources allocated in a previous epoch.

An apparatus for scheduling stream-based applications in a distributed computer system includes a scheduler configured to schedule non-continual work using a macro method configured to determine jobs to be run in a distributed stream-oriented system in accordance with a priority threshold above which jobs will be accepted, below which jobs will be rejected, to minimize projected penalty. The non-continual macro method includes a quantity component configured to minimize penalty by deciding which jobs to run, when to execute the jobs, and how much resources to allocate to the PEs in the running jobs. The non-continual macro method includes a "where" component configured to allocate appropriate processing power (from the processing nodes) to processing elements in the running jobs.

Another method for choosing non-continual jobs to run in a stream-based distributed computer system includes determining a total amount of resources to be consumed by non-continual jobs, determining a priority threshold above which jobs will be accepted, below which jobs will be rejected, minimizing overall penalties relative to the priority threshold based on estimated completion times of the jobs, and applying system constraints to ensure that jobs meet set criteria such that a plurality of non-continual jobs are scheduled which consider the system constraints and minimize overall penalties using available resources.

A system for scheduling non-continual application tasks in a distributed computer system includes a scheduler implemented in a computer usable medium having a computer readable program configured to schedule work using a non-continual macro method. The scheduler is configured to determine a total amount of resources to be consumed by non-continual jobs, decide which non-continual jobs to be run in a distributed stream-oriented system in accordance with a priority threshold above which jobs will be accepted, below which jobs will be rejected. The scheduler is also configured to minimize overall penalties relative to the priority threshold based on the estimated completion times. The non-continual macro method includes a quantity component configured to minimize penalty by determining jobs to run, a starting time and resources of processing elements, among running jobs chosen and a where component configured to allocate resources from processing nodes to the processing elements in the running jobs.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
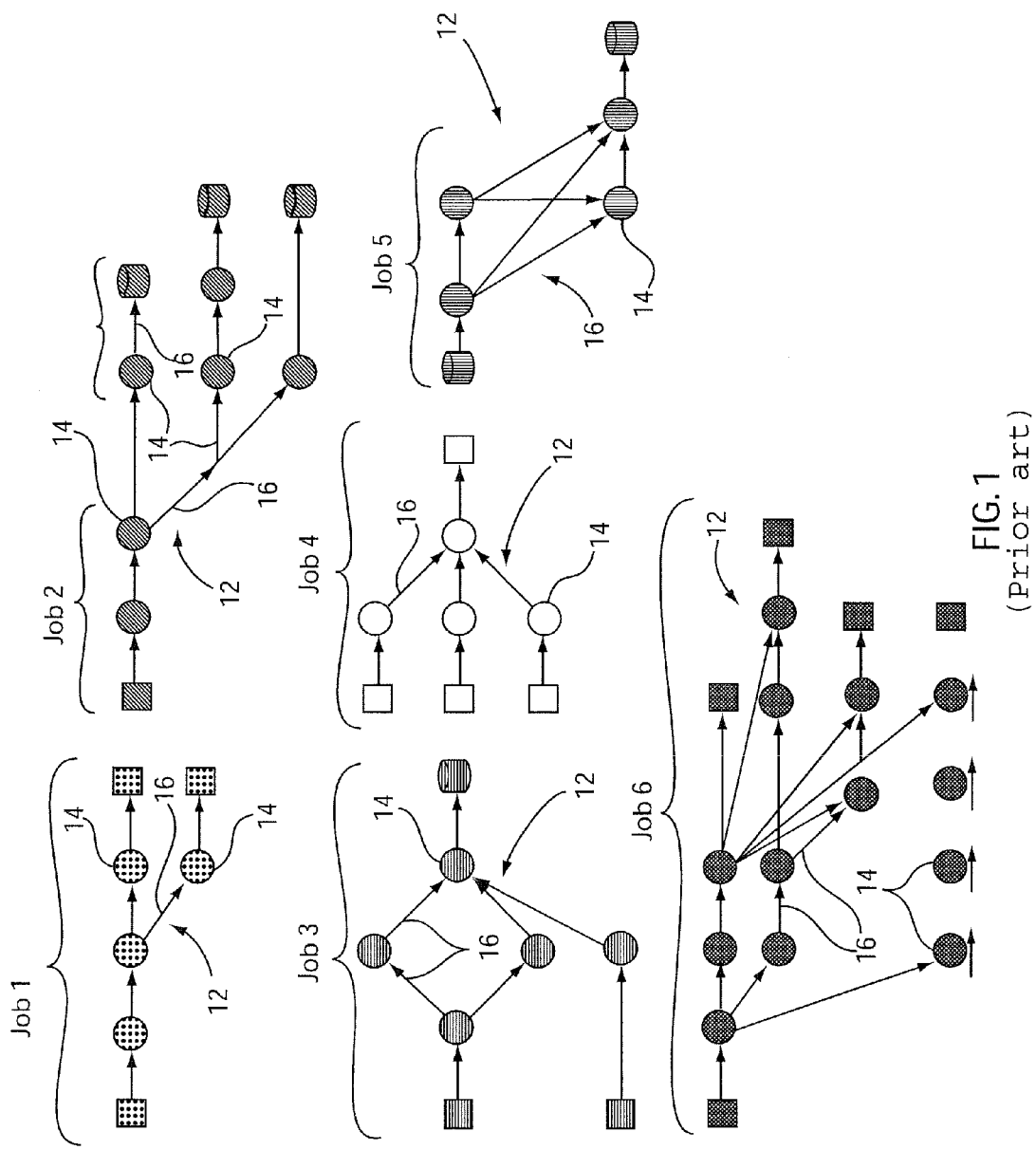
FIG. 1 depicts an example of a collection of jobs, including precedence constraints among the processing elements in each job.
Figure 2:
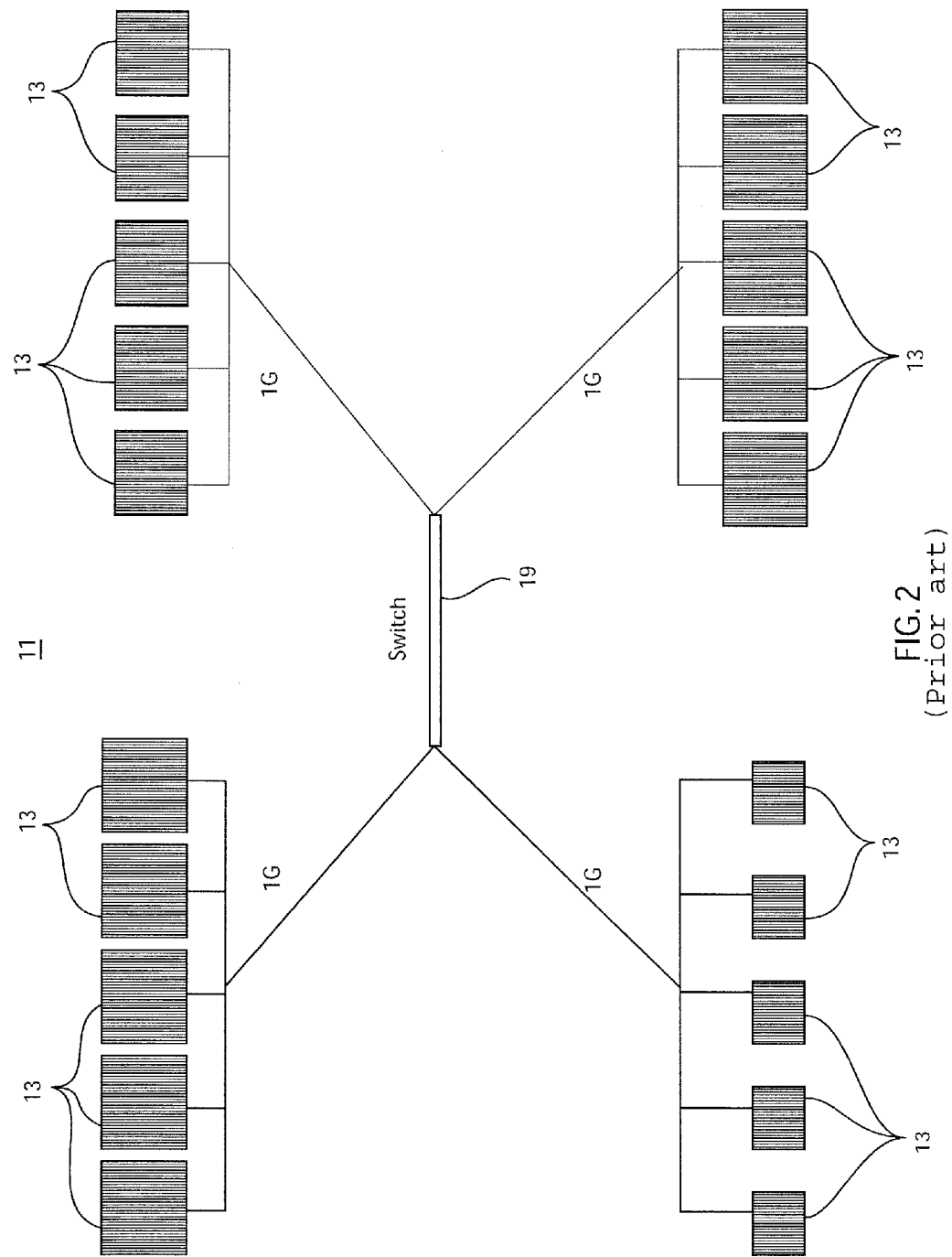
FIG. 2 depicts an example of processing nodes and a network of a distributed stream-based system including switches.

Embodiments of the present invention include an epoch-based system and method for partitioning system resources between continual and non-continual jobs, choosing non-continual jobs, determining the start times and amount of resources for the processing elements of the chosen jobs, and creating a list of candidate processing nodes (PNs) for each of the processing elements (PEs) in a distributed stream-oriented computer system. In one particularly useful embodiment, a method is given a metric describing the penalty of the jobs as a function of time-based penalties of the PEs, precedence constraints among the PEs of the jobs, job priorities, and also security, licensing, resource matching and other rules for what constitutes an acceptable set of candidate PNs for a PE. A description of the current candidate nodes, a list of those candidate nodes which cannot be modified from their current values, and rules for the maximum amount of change permitted to these candidate nodes may also be included.

A hierarchical scheduler for distributed computer systems is particularly useful for stream-based applications. The scheduler attempts to minimize the penalty of all work in the system, subject to a large number of constraints of varying importance. The scheduler includes two or more methods and distinct temporal levels.

In one embodiment, three major methods at three distinct temporal levels are employed. The distinct temporal levels may be referred to as macro, micro and nano models or levels, respectively. The macro model comprises one model, each for continual and non-continual jobs.

At the macro level, there also exists a model (Resource Partitioner) for partitioning the resources of the system among continual and non-continual jobs. The non-continual macro model schedules all non-continual events in sync with micro epochs; all PE processes will start/terminate exactly at the end of a micro epoch. As a consequence, the micro model is common for both continual and non-continual jobs.

The time unit for the micro model is a micro epoch, e.g., on order of minutes. The input to the micro model may include a list of which jobs will run, and the lists of candidate processing nodes for each processing element that will run, as given by the macro model. The output is a set of fractional allocations of processing elements to processing nodes. The nano model makes decisions every few seconds, e.g., about two orders of magnitude less than a micro epoch. One goal of the nano model is to implement flow balancing decisions of the micro model at a much finer temporal level, dealing with burstiness and the differences between expected and achieved progress. Such issues can lead to flooding of stream buffers and/or starvation of downstream processing elements.

Although the non-continual macro model works well in the hierarchical system, it may be employed independently as well. A time scale or unit for the non-continual macro method is a macro epoch, which is, for example, on the order of a half hour. The output choices of jobs, start times for PEs, and candidate node assignments obey described rules.

In one embodiment, a 'quantity' stage and a 'where' stage are provided for the non-continual macro model. The macro model works well when used in conjunction with a micro model and nano model in a hierarchically processed temporal system where scheduling work is performed through temporal epochs which are related to the processing resources needed to arrive at a solution. The output of the non-continual macro model includes job choices, start times for PEs in the chosen jobs, and candidate assignments of processing elements (PEs) to processing nodes (PNs).

In one embodiment, a model for partitioning the system resources among continual and non-continual jobs is presented. The output of the Resource Partitioner model is a division of the resources of the system. A commonly assigned disclosure, patent Ser. No. 11/374,192, filed Mar. 13, 2006, entitled: METHOD AND APPARATUS FOR SCHEDULING WORK IN A STREAM-ORIENTED COMPUTER SYSTEM, is hereby incorporated by reference. This disclosure describes the scheduler in greater detail. A commonly assigned disclosure, patent Ser. No. 11/374,643, filed Mar. 13, 2006, entitled: METHOD AND APPARATUS FOR ASSIGNING FRACTIONAL PROCESSING NODES TO WORK IN A STREAM-ORIENTED COMPUTER SYSTEM, is hereby incorporated by reference. This disclosure describes the micro method in greater detail. A commonly assigned disclosure, patent Ser. No. 11/374,399, filed Mar. 13, 2006, entitled: METHOD AND APPARATUS FOR ASSIGNING CANDIDATE PROCESSING NODES IN A STREAM-ORIENTED COMPUTER SYSTEM, is hereby incorporated by reference. This disclosure describes the macro method for continual jobs in greater detail. The present disclosure provides a number of new and novel concepts, which are now illustratively described.

Penalty function: Each PE in a non-continual job will have a penalty function associated with the PE. This is an arbitrary real-valued function whose domain is a cross product from a list of metrics such as quality, completion time and so on. Functions may include response time, lateness, tardiness, cost of missing a deadline, or more generally, any non-decreasing step function of completion time. Nevertheless, the present embodiments are designed to be completely general with regard to penalty functions. The only property that this penalty function needs to satisfy is that it increases as a function of the completion time.

Resource Function: Each resource function maps the resources consumed by each PE in a non-continual job to its execution time. In some sense, the resource function describes the "malleability" of a PE. The present embodiments are designed to be completely general with regard to resource functions; the only property that they need to satisfy is that the execution time is non-decreasing in the resources consumed.

Penalty: Each PE in a non-continual job has a penalty which depends on its completion time. The summation of this penalty over all PES in a job, and over all jobs is the overall penalty being produced by the computer system, and this is one quantity that present embodiments attempt to minimize.

Priority Number: Each non-continual job in the computer system has a priority number which is effectively used to determine whether the job should be run at some positive level of resource consumption. The penalty, on the other hand, determines the amount of resources to be allocated to each job that will be run.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD, and DVD-R/W.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 3:
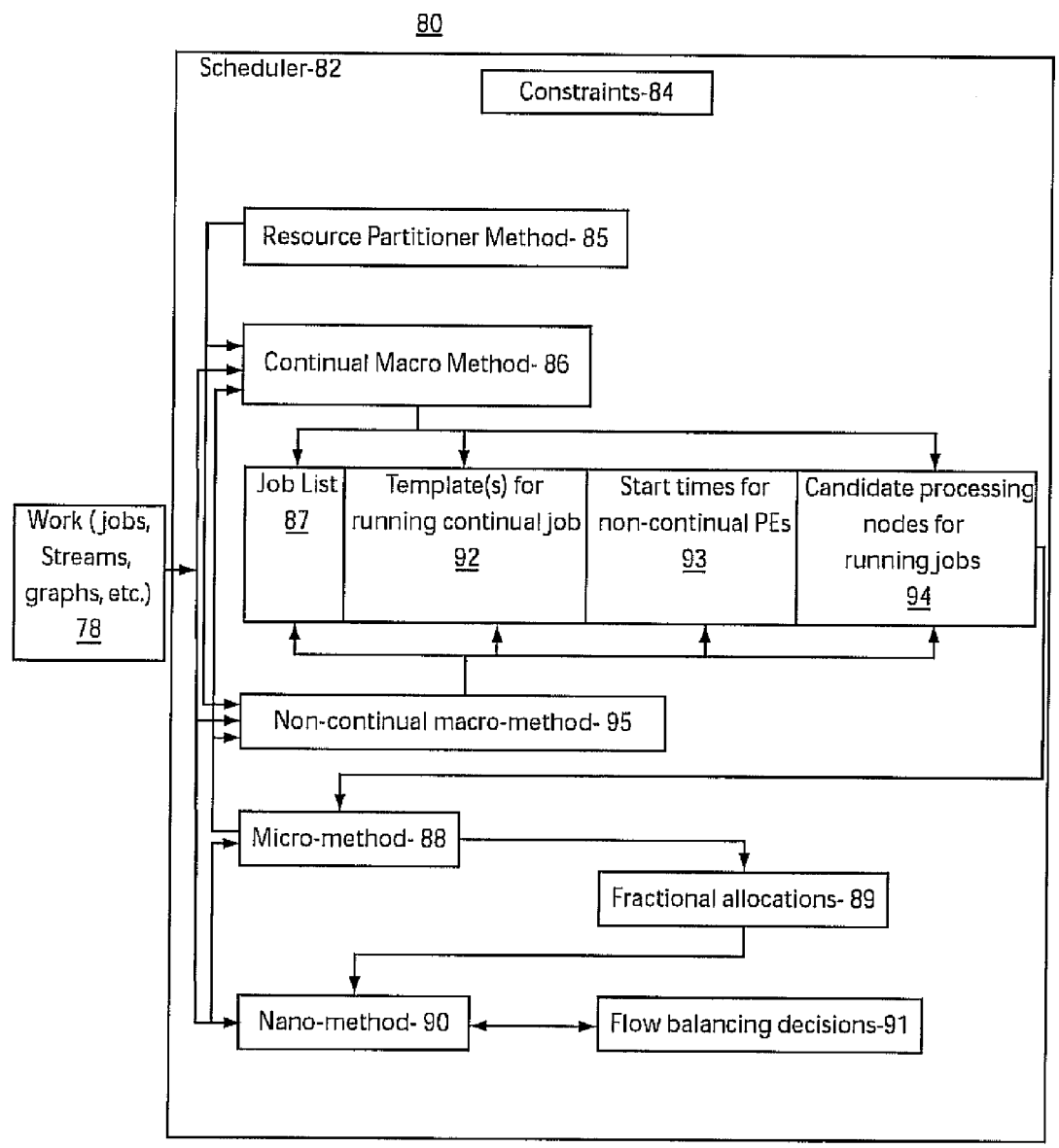
FIG. 3 is a block/flow diagram illustratively showing a scheduler in accordance with one embodiment.

Referring now to the drawings in which like numerals represent the same or similar elements and initially to FIG. 3, a block/flow diagram shows an illustrative system 80. System 80 includes a hierarchically designed scheduler 82 for distributed computer systems designed for stream-based applications. The scheduler 82 attempts to maximize the importance of all work in the system, subject to a large number of constraints 84. The scheduler 82 includes three major methods at three distinct temporal levels. These are referred to as macro (86, 95), micro 88 and nano 90 models or modules, respectively. The macro method includes two separate modules, one each for continual jobs (86) and non-continual jobs (95). In addition, a Resource Partitioner method 85 partitions the resources of the system among the continual and non-continual jobs every macro epoch.

The scheduler 82 receives work 78, e.g., templates, data, graphs, streams or any other schema representing jobs/applications to be performed by system 80. The scheduler 82 employs the constraints 84 and the hierarchical methods to provide a solution to the scheduling problems presented using the three temporal regimes as described herein.

The Resource Partitioner method/model 85 divides the resources available to the system 80 between the continual and non-continual jobs. In the macro methods/models 86 and 95, constraints 84 or other criteria are employed to permit the best scheduling of tasks. The macro methods 86 and 95 perform the most difficult scheduling tasks. The output of the continual macro model 86 is a list 87 of which jobs will run, a choice of one of potentially multiple alternative templates 92 for running the job, and lists 94 of candidate processing nodes for each processing element that will run. The output of the non-continual macro model 95 is the list 87 of which jobs will run, start times 93 for each of the processing elements of the chosen jobs, and the lists 94 of candidate processing nodes for each processing element that will run. The output of the micro model 88 includes fractional allocations 89 of processing elements to processing nodes based on the decisions of the macro models 86 and 95. The nano model 90 implements flow balancing decisions 91 of the micro model 88 at a much finer temporal level, dealing with burstiness and the differences between expected and achieved progress.

At a highest temporal level (macro), a partitioning of the resources of the system, the jobs that will run, the best template alternative for those continual jobs that will run, the best starting times for the PEs of the non-continual jobs that will run, and candidate processing nodes for the processing elements for each running job are selected to maximize the importance of the work performed by the system. At a medium temporal level (micro), fractional allocations and reallocations of processing elements are made to processing nodes in the system to react to changing importance of the work. At a lowest temporal level (nano), the fractional allocations are revised on a nearly continual basis to react to the burstiness of the work, and to differences between projected and real progress. The steps are repeated through the process. The ability to manage the utilization of time at the highest and medium temporal level, and the ability to handle new and updated scheduler input data in a timely manner are provided.

Figure 4:
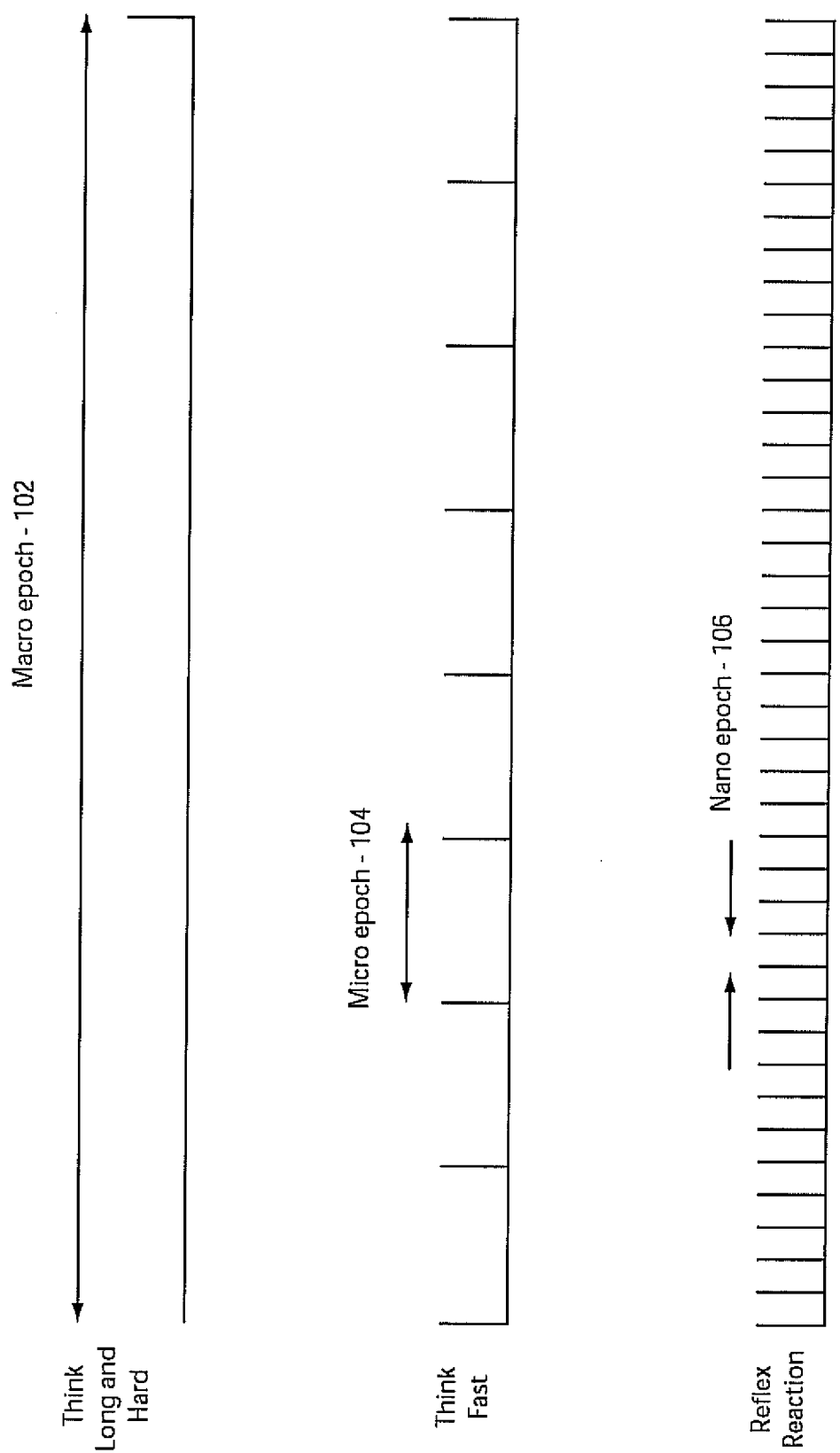
FIG. 4 depicts three distinct temporal levels of the three epoch-based models referred to as macro, micro and nano epochs.

Referring to FIG. 4, three distinct time epochs 102, 104, and 106, and the relationships between three distinct models are illustratively shown. The time epochs include a macro epoch 102, a micro epoch 104 and a nano epoch 106. Note that each macro epoch 102 is composed of multiple micro epochs 104, and that each micro epoch 104 is composed of multiple nano epochs 106. The macro models 86 and 95 (FIG. 3) have sufficient time to "think long and hard". The micro model 8 (FIG. 3) only has time to "think fast". The nano model 90 (FIG. 3) effectively involves "reflex reactions".

The scheduling problem is decomposed into these levels (102, 104, 106) because different aspects of the problem need different amounts of think times. Present embodiments more effectively employ resources by solving the scheduling problem with an appropriate amount of resources. The Resource Partitioner (85, FIG. 3) divides the system into two parts, one of which is reserved for scheduling continual work, and the other for non-continual work. Resource Partitioner 85 makes these decisions in an attempt to maximize the total importance of the system, trading off the contributions from continual and non-continual work. The Resource Partitioner 85 divides all resources in the system; in particular, the non-continual and continual PEs are handled separately by pre-allocating certain processing resources (clusters). Thus, any cluster can be assigned to either non-continual or continual PEs, but not both. Resource Partitioner 85 also pre-assigns a fixed quantity of licenses to nodes processing non-continual PEs.

Figure 5:
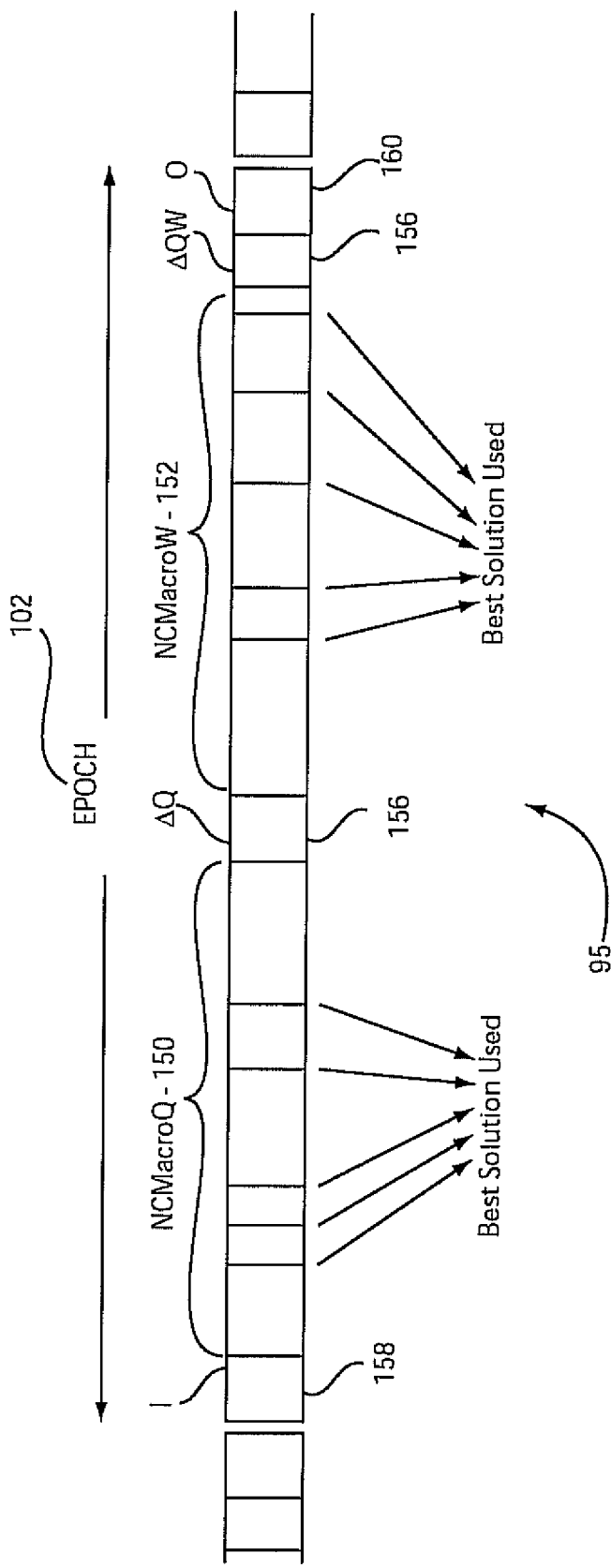
FIG. 5 depicts the decomposition of the macro epoch into its six component times, including times for an input module, an NCmacroQ module, an optional ΔQ module, an NCmacroW module, an optional ΔQW module and an output implementation module.

Referring to FIG. 5, the non-continual macro model 95 has two major methods, which are preferably executed sequentially. These are referred to as NonContinual MacroQuantity (NCmacroQ) and NonContinual MacroWhere (NCmacroW) modules, 150 and 152, respectively. These two modules 150 and 152 can be described as follows. NCMacroQ 150 is the 'quantity' component of the macro model 95. NCMacroQ 150 minimizes projected penalty by deciding which jobs to run, determining the starting times for the PEs in the running jobs, and by allocating appropriate processing power, in, e.g., millions of instructions per second (mips), to each processing element of the running jobs. Embodiments may employ, e.g., a combination of the mixed integer programming, ready-list based scheduling heuristics and resource allocation problem techniques.

NCMacroW 152 is the 'where' component of the non-continual macro model 95. NCMacroW 152 determines candidate processing node assignments for the processing elements in the running jobs based on the output from the NCmacroQ module 150, subject to incremental, security, licensing, resource matching and other constraints. Embodiments may employ time-indexed integer linear programming inspired and other heuristic techniques.

The manner in which the non-continual macro model is decoupled is illustratively demonstrated. There are two sequential methods 150 and 152, plus an input module (I) 158 and an output implementation module (O) 160. There are also two optional 'Δ' models, $\Delta Q$ 154 and $\Delta QW$ 156, which permit for updates and/or corrections in the input data for the two sequential methods 150 and 152, by revising the output of these two methods incrementally to accommodate changes. The present embodiment describes the two decoupled sequential methods below.

NCMacroQ 150 minimizes projected penalty by deciding which jobs to run, determining the starting times for the PEs in the running jobs, and allocating appropriate processing power, in mips, to each processing element of the running jobs. Aspects in accordance with present principles may employ a combination of the mixed integer programming, ready-list based scheduling heuristics and resource allocation problem techniques.

NCMacroW 152 determines candidate processing node assignments for the processing elements in the running jobs based on the output from the NCmacroQ module 150, subject to incremental, security, licensing, resource matching and other constraints. Aspects may employ time-indexed integer linear programming inspired and other heuristic techniques.

The output at output module 160 includes a list of which jobs to run in a distributed stream-oriented computer system, a decision of when to start processing each PE in the chosen jobs, and a list of candidate processing nodes to handle the processing elements of those jobs. The goal of the last output (160) of the macro model is to assist a micro model to handle variability in the relative importance of work, changes in the state of the system, changes in the job lists, changes in the job stages, without having to consider the difficult constraints handled in accordance with the present principles. Network utilization is minimized in the process, by optimizing the proximity of the processing elements.

NCMacroQ 150 is the 'quantity' component of the macro model 95. NCMacroQ 150 minimizes projected penalty by deciding which jobs to run, determining the starting times for the PEs in the running jobs, and by allocating appropriate processing power, in millions of instructions per second (mips), to each processing element of the running jobs. Embodiments may employ a combination of the mixed integer programming, ready-list based scheduling heuristics and resource allocation problem techniques.

NCMacroW 152 is the 'where' component of the non-continual macro model 95. NCMacroW 152 determines candidate processing node assignments for the processing elements in the running jobs based on the output from the NCmacroQ module 150, subject to incremental, security, licensing, resource matching and other constraints. Embodiments may employ time-indexed integer linear programming inspired and other heuristic techniques. Most of the decision variables in the NCmacroQ module 150 (and thus its output) are input data for the NCmacroW module 152.

NonContinual MacroQuantity Model (NCMacroQ): The NCmacroQ model 150 finds a set of jobs to run during the current macro epoch. Within each job non-continual macro quantity model 150 chooses an "optimal" start time for each PE in the job, satisfying any precedence constraints among them. The jobs have so-called priorities, and the jobs actually run respecting an appropriate priority constraint to be described below. One goal of the NCmacroQ model 150 is to minimize the cumulative penalty of the winning jobs, derived from the individual penalties of the PEs in the winning jobs. In the process of solving the problem, NCmacroQ model 150 computes the minimum penalty, the list of job choices, the set of start times for each PE, and finally the set of processing power goals, measured in millions of instructions per second (mips) for each of the PEs within the chosen list. We use a rolling time-horizon approach to solve NCmacroQ; at the beginning of every macro epoch, we re-solve the problem using all the PEs that have not yet been allocated.

The NCmacroQ problem can be formalized using the following notation. Let J denote the number of jobs being considered, indexed by j. Each job j has a priority $\pi_j$, a positive integer. The convention is that lower numbers indicate higher priorities. Thus, the highest possible priority is 1. Any subset $\bar{J}$ of $\{1, \ldots, J\}$ will be called a job list. A major function of NCmacroQ 150 is to make a "legal and optimal" choice of a job list. Now define the notion of a legal job list $\bar{J}$. For such a list one insists that j in $\bar{J}$ and j' not in $\bar{J}$ implies that $\bar{\pi}_j \leq \bar{\pi}_{j'}$. Let L denote the set of legal job lists.

Each job gives rise to a directed acyclic graph D(j) whose nodes are the PEs in the template and whose directed arcs are the precedence constraints among the PEs. Let $\preceq$ denote the precedence relation among the PEs of various jobs. If PE p of job j must precede PE q of job j, we represent it as $p \preceq q$.

Figure 12:
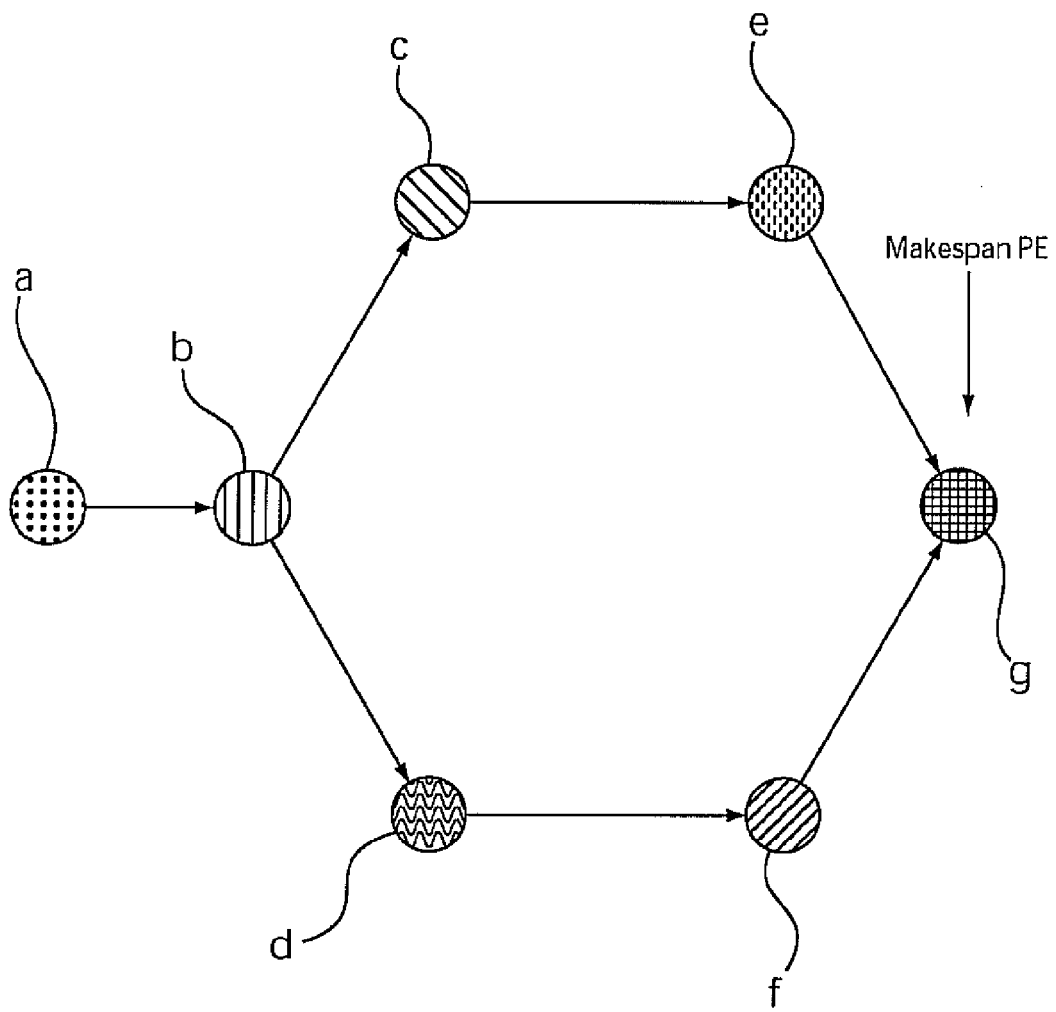
FIG. 12 depicts precedence constraints among the PEs for a particular job.

We assume that there are no precedence constraints among the jobs. In other words, the jobs are independent. If two jobs need to satisfy some precedence constraints, then we aggregate them to form a single job. In FIG. 12, we present an example illustrating the precedence constraints amongst the PEs in a particular job.

Each PE p of job j is "malleable" in the sense that the execution time is a function $T^{p,j}$ of the amount of processing power (in MIPS) $g^{p,j}$ assigned to the PE. This function can be quite arbitrary; the only restriction being that it is non-increasing in $g^{p,j}$. Thus g<g' implies $T^{p,j}(g) \geq T^{p,j}(g')$.

Figure 11:
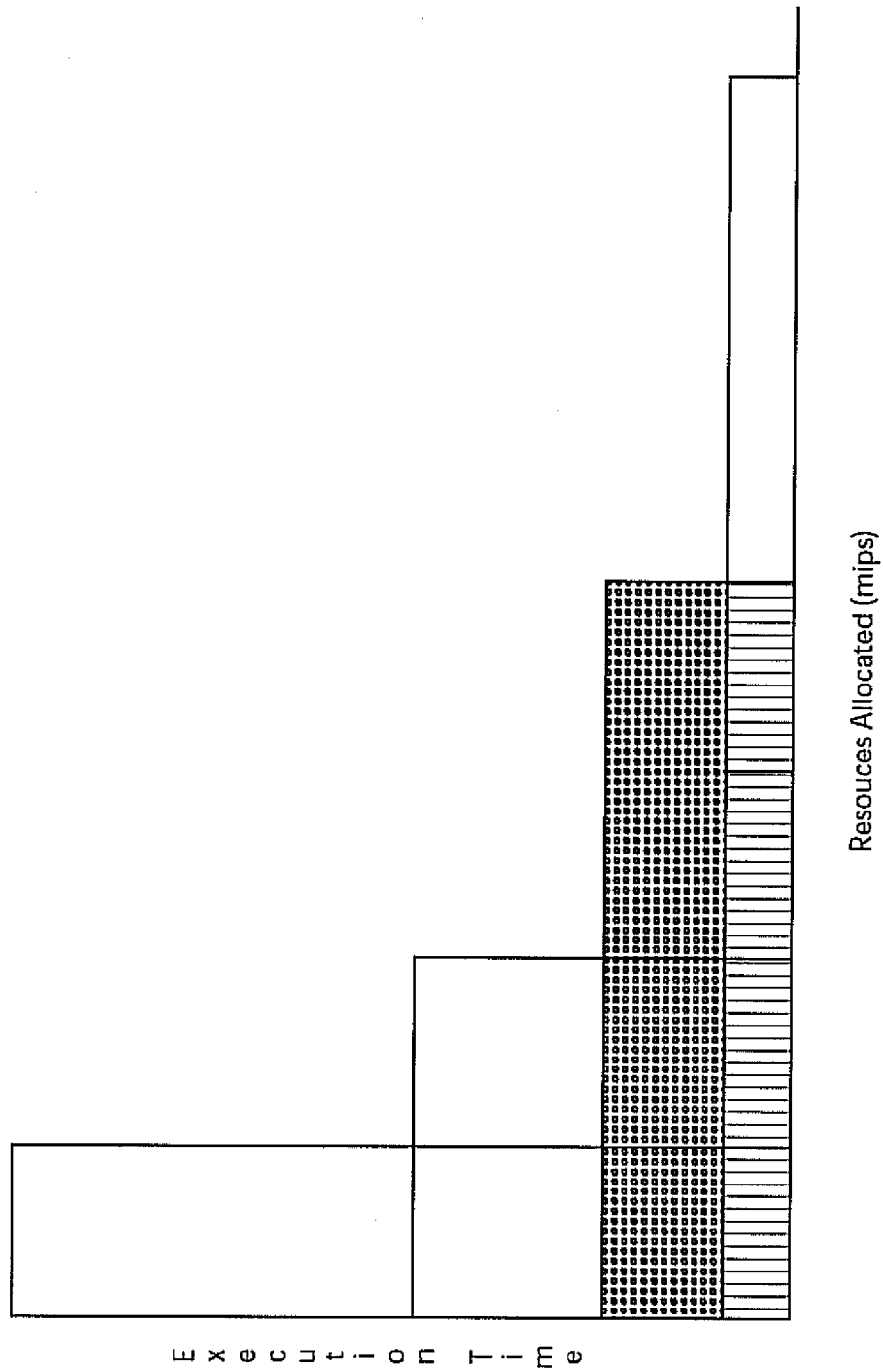
FIG. 11 depicts execution time of a PE as a function of an amount of resources given to the PE.

In FIG. 11, we depict an instantiation of this function $T^{p,j}$ for a particular PE p of job j. We see that as the amount of MIPS allocated to the PE increases, its processing time decreases.

Let G denote the total amount of processing power, in mips. Let mp denote the minimum amount of processing power which can be given to PE p if it is executed. Similarly, let Mp denote the maximum amount of processing power which can be given to PE p if it is executed. Suppose that the set $\bar{J}$ represents the jobs that must be executed.

The amount of MIPS $g^{p,j}$ given to PE p is a decision variable of the problem, and is constrained by $mp \leq g^{p,j} \leq Mp$. The other decision variable will be the start time $s^{p,j}$ of PE p. Given a start time $s^{p,j}$ and a MIPS allocation $g^{p,j}$ PE p of task j will complete at (a deterministic) time $c^{p,j} = s^{p,j} + T^{p,j}(g^{p,j})$. We also model hard deadlines and release times. To do so, if the release time of PE p is $R^{p,j}$ and its deadline is $D^{p,j}$, then we enforce $R^{p,j} \leq s^{p,j}$ and $c^{p,j} \leq D^{p,j}$.

Figure 10:
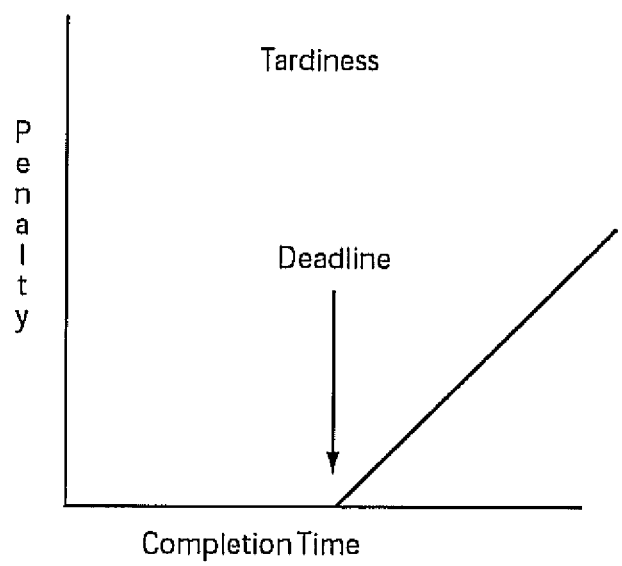
FIG. 10 depicts a penalty function associated with the PEs of various jobs.

For each PE p of job j, $F^{p,j}(t)$ is the penalty associated with completing it at time t. This function can be arbitrary; the only restriction is that it is a non-decreasing function of the completion time. Other functions may include response time, lateness, tardiness, cost of missing a deadline, or more generally, any non-decreasing step function of time. An example is presented in FIG. 10, which illustrates a penalty function for the Tardiness objective.

Let $A^{p,j}$ be an indicator of whether PE p of job j is active at a given time; $A^{p,j}(t)=1$ if $s^{p,j} \leq t \leq c^{p,j}$, and 0 otherwise.

Objective Function: Seek to minimize the sum of the PE penalty functions across all possible legal job lists that satisfy the following constraints. The objective function, which is to be minimized is therefore $$\sum_j \sum_p F_p^j(c_p^j).$$

Constraints:

$$\sum_j \sum_p A^{p,j}(t) g^{p,j} \leq G \ \forall \ t \quad (1)$$

$$mp \leq g^{p,j} \leq Mp \quad (2)$$

$$\bar{J} \subseteq J \quad (3)$$

$$c^{p,j} = s^{p,j} + T^{p,j}(g^{p,j}) \quad (4)$$

$$p \text{ precedes } q \rightarrow c^{p,j} \leq s^{q,j} \quad (5)$$

$$R^{p,j} + T^{p,j}(g^{p,j}) \leq c^{p,j} \leq D^{p,j} \quad (6)$$

Interpretation of the Constraints: Constraint (1) is the resource allocation constraint. Together with the minimization goal constraint (1) ensures that all of the resource is used, if that is possible. (It might not be possible, based on, for example, the other constraints). Constraint (2) insists a PE p be within some minimum and maximum range if it is executed. Constraint (3) insists that necessary jobs are executed. Constraint (4) ensures that the completion times are mapped onto the right values. Precedence conditions are represented by constraints (5). On the other hand, constraints (6) ensure that the start/completion times of each PE satisfies its release times and deadlines. The constraint on priorities is implicit in the definition of the problem.

Figure 6:
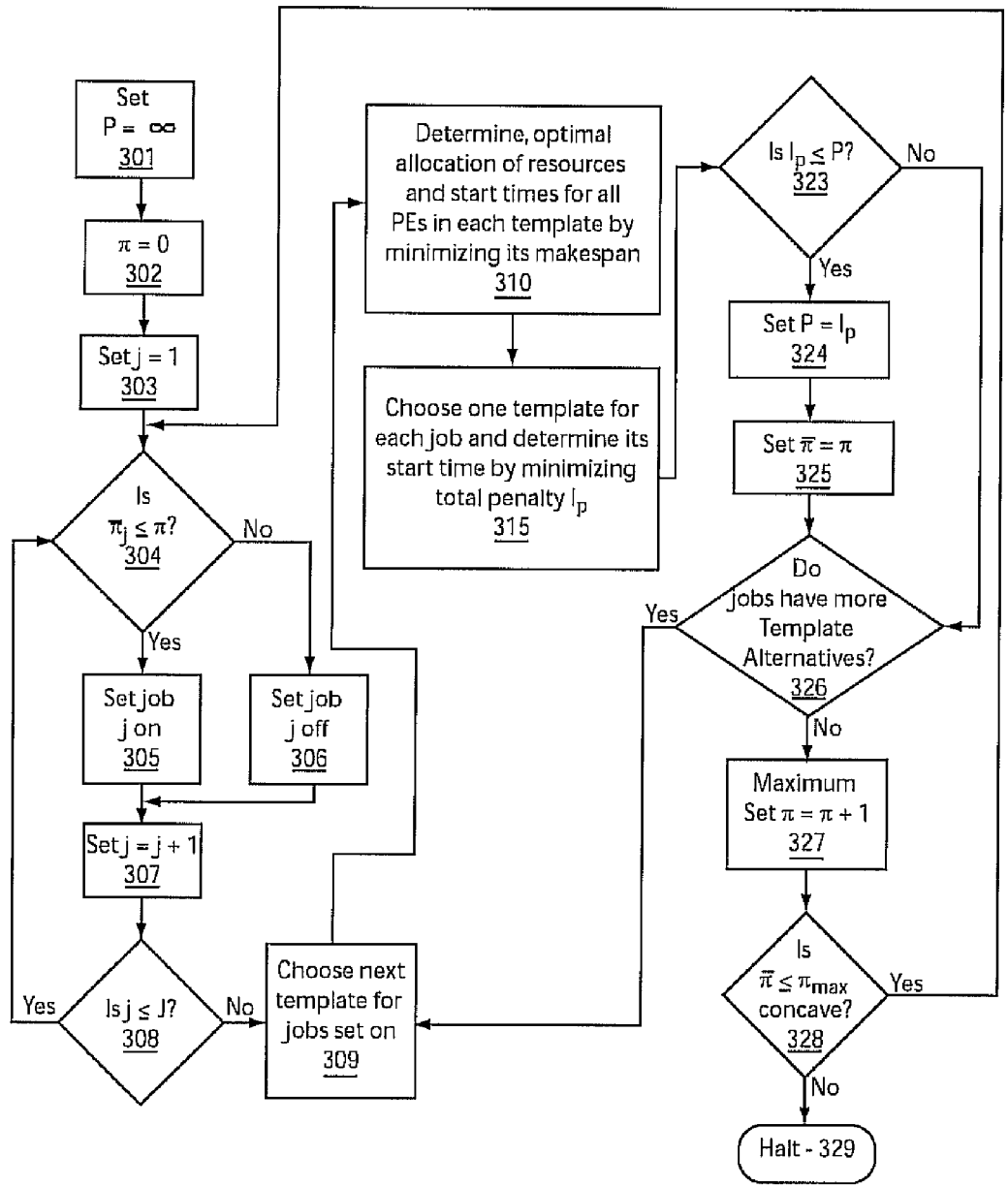
FIG. 6 is a block/flow diagram showing process steps for obtaining a solution for a NCmacroQ module in accordance with an illustrative embodiment.

At a high level, a particularly useful embodiment enumerates a large number of resource allocation problems for each job. Within each of these, the embodiment solves the best allocation of resources and the relative start times for each PE in the job. This problem is equivalent to the minimization of a make-span of malleable multiprocessor tasks in the presence of precedence constraints. The make-span of a schedule is the completion time of the last job; i.e., it is the time it takes to process all the jobs. Each instance may be solved via shelf-based ready-list based heuristics and a mini-max resource allocation problem. (Those skilled in the art will understand that this is a known optimization tool. See e.g., T. Ibaraki and N. Katoh, "Resource Allocation Problems", MIT Press, 1988 for details, henceforth referred to as I&K). In FIG. 6, this stage corresponds to block 310, and is also referred to as the Inner Problem.

These solutions from all the Inner Problems can be merged by choosing one template for each job, and packing these templates to minimize the total penalty. This is a malleable independent rectangle packing problem with a very general objective function, and may be solved by a variety of techniques, in particular, bin-packing algorithms or by a time-indexed integer linear program. (Those skilled in the art will know that ILPs are well-understood in the literature. See, for example, D. Bertsimas and J. Tsitsiklis, "Introduction to Linear Optimization", Athena Scientific, 1997). The output of this procedure chooses the start time and resources allocated to the PEs of all chosen jobs. In FIG. 6, this stage corresponds to block 315, and is also referred to as the Outer Problem.

A key assumption that this useful embodiment makes is that the penalty of each job depends only on a single penalty function per job, applied to the make-span PE of the job. This allows us to de-couple the problem in two a hierarchical framework, wherein each level corresponds to the Inner and Outer problem, as summarized above, and described in more detail next. However, other, more complex embodiments may not require this assumption.

Inner Problem: This stage can be interpreted as creating valid templates for the jobs. Hence, this is an intra-job problem, solved for each template of the jobs, where each template corresponds to the total resources given to the job, and the solution can be interpreted as the relative start times and resource allocations for each PE in the job.

Figure 13:
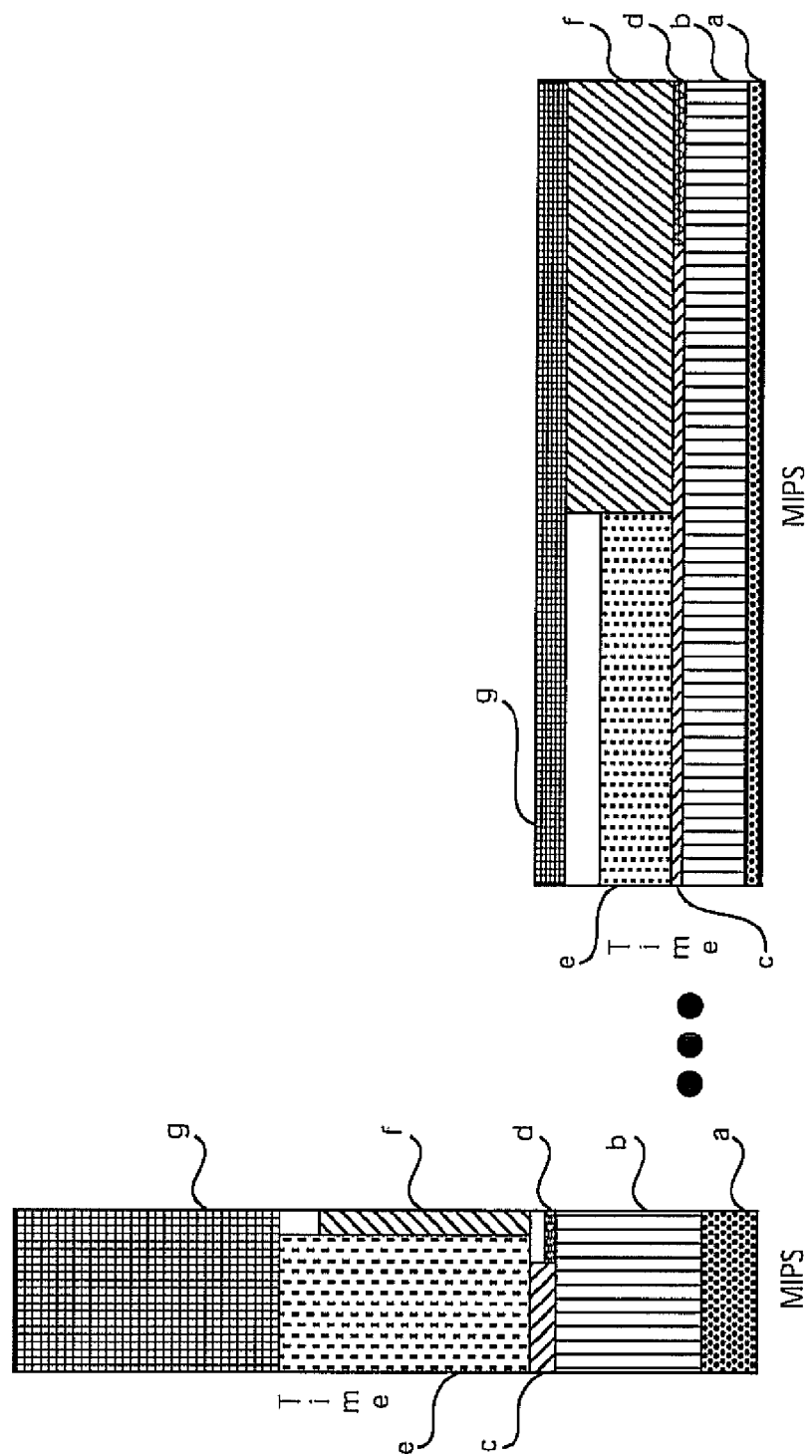
FIG. 13 depicts possible solutions for various templates for a job, each of which correspond to the amount of resources provisioned for the job.

In FIG. 13, we depict possible solutions for two template choices for the job represented in FIG. 12. Observe that the start times of the various PEs (a-f) in the templates satisfy the precedence constraints among them, and that the execution times of the PEs decrease as the processing resources allocated to them increases.

For a discrete number of template alternatives, each corresponding to a net MIPS allocation for job, the Inner Problem can be thought of as packing the PEs within the job into a "container" of this "width", to minimize make-span.

Each inner problem is therefore a generalization of malleable make-span scheduling of traditional tasks, with the addition of precedence constraints. In one particular embodiment, the inner problem is solved using various ready-list shelf based schemes.

Outer Problem: This stage can be interpreted as choosing a valid template, and a starting time, for each job. Hence, this is an inter-job problem, where the set of templates for each job corresponds to "malleable" alternatives for each job, and the solution can be interpreted as the start time and amount of processing allocated for each job.

Figure 14:
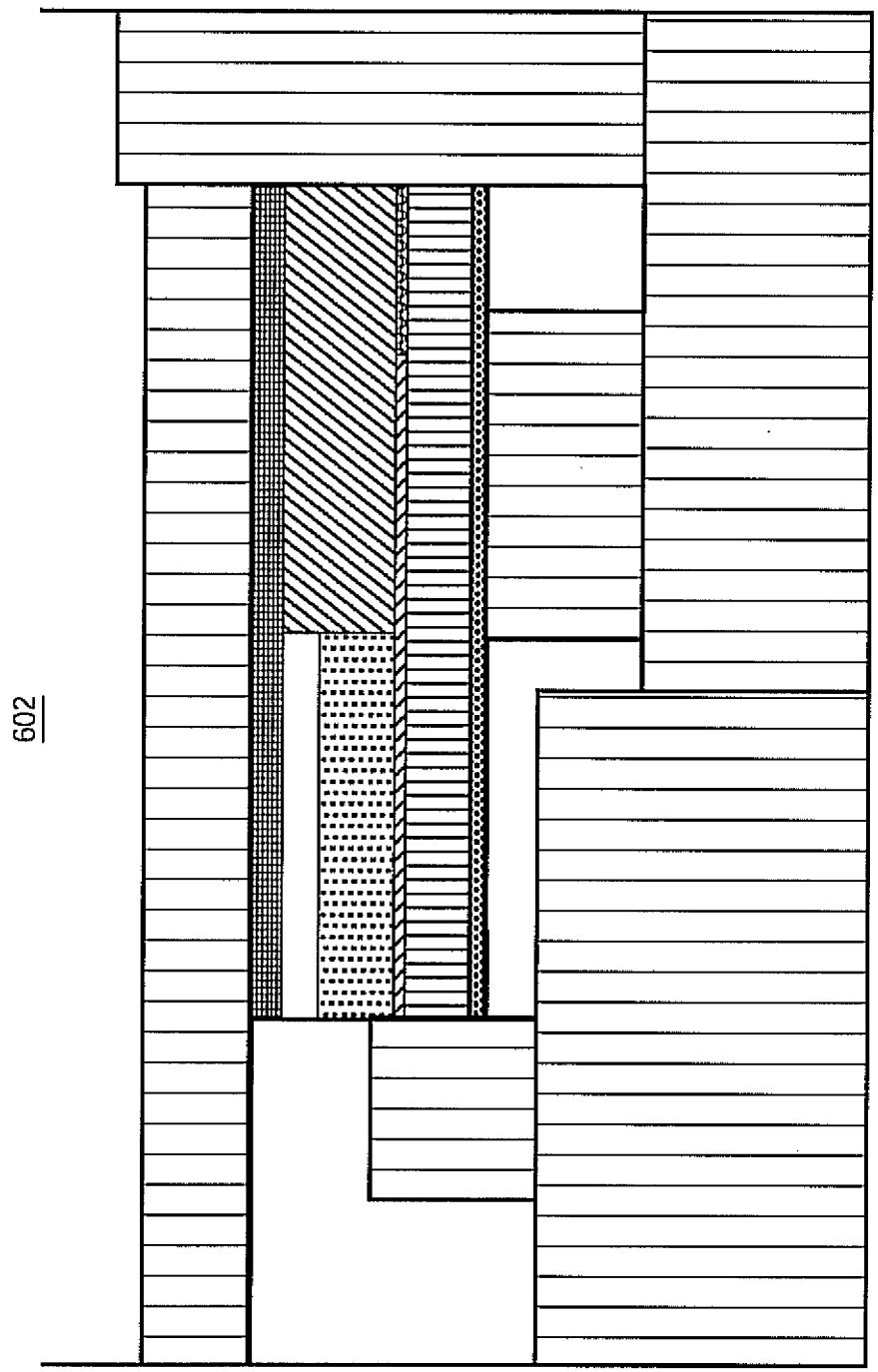
FIG. 14 depicts one potential solution provided by the NCmacroQ module, in which one template is chosen for each job, and the start times for each job are determined so as to minimize the net system penalty.

In FIG. 14, we depict one possible solution of this stage. Here, one template 502 is chosen for each job, and these templates are packed together to minimize the total system penalty.

For the set of jobs, the outer problem can be thought of as packing the jobs into a "container" of width equal to the total processing resources in the system, subject to release date and deadline constraints, in order to minimize the net penalty. Each outer problem is therefore a generalization of a malleable scheduling of traditional tasks with a monotonically non-decreasing objective function (in the completion times of the tasks). In one particular embodiment, the outer problem is solved using time-indexed integer linear programming problem (ILP).

Overview of NCmacroQ:

Referring to FIG. 6, a flowchart of the main components of the NCmacroQ model (210) are illustratively shown. The method/program begins in block 301 by setting a winning penalty value P equal to ∞. (In other words, set P to a very large positive number). In block 302, the method sets π to be 0. The value π will indicate the level of revised priority, and will determine whether or not a job is tentatively allowed to run. All jobs with priority π or better will be tentatively allowed to run at a given time, and the best solution over all such π will be chosen in the end. In block 303, j is initialized to 1. In block 304, the method checks to see if the revised priority of the job j is less than or equal to π (In other words, $\overline{\pi}j \leq \pi$) If the revised priority is less than or equal to π, block 305 sets the job on. If not, block 306 sets the job off. In either case, block 307 increments j by 1. Then, block 308 checks to see if j is less than or equal to J. If j is less than or equal to J, control is returned to block 304. Otherwise, the method proceeds with block 309, which chooses a template alternative in $Q^j$ for each job j that is set on. Let $T^j$ be the current set of chosen templates (Initially, $T^j$ is empty).

The method/program then proceeds to block 310, which determines, for each job tentatively chosen to run, the optimal allocation of resources and relative start times of all its PEs for the most recently chosen template. Those skilled in the art will know that this can be done, for each template, by using a shelf-based ready-list algorithm that solves a mini-max resource allocation problem for each shelf (see I&K). Block 315 then chooses one template for each job (from set $T^j$) and determines the start time for each job such that the total penalty is minimized. Let this penalty be $I_p$. Those skilled in the art will recognize that this can be solved using either bin-packing algorithms or by integer linear programming.

At the completion of block 315, control is passed to block 323. There a check is made to see if the resulting total penalty $I_p$ derived from the solution of block 315 allocation problem is smaller than P. If $I_p$ is smaller, block 324 sets P equal to $I_p$, and block 325 sets $\overline{\pi}$ equal to π, where $\overline{\pi}$ is the revised priority. Then, and if $I_p$ was greater than P in block 323, control is passed to block 326. This step tests to see if there are more template choices amongst the jobs that are currently set on; i.e., if $T^j \subset Q^j$. If the answer is yes, the method/program returns to block 309. Otherwise, the method/program proceeds to block 327. Block 327 increments π by 1. Then, block 328 checks to see if π is less than or equal to the maximum $\pi_{max}$ of all priorities of all the jobs. If it is, control is returned to block 304. If not, the NCmacroQ model (210) terminates at block 329 with the optimal solution to the quantity phase.

NonContinual MacroWhere Model (NCMacroW): The NCmacroW model (152 in FIG. 5) receives a set of PEs from the NCmacroQ model (150 in FIG. 5). These PEs will ultimately need to be assigned to the processing nodes (PNs) in a computer system, but the environment is very dynamic and the resource requirements of PEs may increase or decrease dramatically over time. Furthermore, since the start time of the PEs is also provided as input by NCmacroQ 150 to NCmacroW 152, all the decisions made by NCmacroW 152 are optimal for all time intervals. If the requirement for a PE increases, the system of the present invention needs to be able to quickly execute the requirement on additional PNs. For this purpose, the NCmacroW model 152 creates a list of candidate nodes where this PE is "ready to run". The "ready to run" list for a PE should be balanced. One cannot grossly over-provision each PE due to limited resources.

On the other hand the NCmacroW model 152 needs to allocate enough resources so that the scheduler can deal with the variations in demands. One goal of NCmacroW 152 is to find such a balanced allocation. In particular, the output of NCmacroW 152 is an assignment of PE to PNs. If a PE is assigned to a PN, this means that this PE is allowed to run on that PN. This assignment needs to respect various constraints, so that the scheduler does not incur problems when it is time to actually run a PE on a PN.

To summarize, the NCmacroQ module 150 provides NCmacroW 152 the following information for each PE p: Start time $s^p$, completion time $c^p$, and resource requirements in MIPS $g^p$, and, in NCmacroW, these PEs are allocated to the processing nodes such that the MIPS requirements are met; at the same time satisfying a variety of constraints. Furthermore, these decisions need to be made every macro epoch. Thus, the NCmacroW problem is solved using a rolling time horizon, where PEs already started will not be reassigned.

At a high level the constraints may include: Processing Requirement constraints: For each PE, NCmacroW 152 receives as input from NCMacroQ 150, the amount of processing (in mips) that the PE needs. In addition, each PN has a limit on how much processing power it can provide. The assignment should meet these requirements.

Resource Matching constraints: For each PE there is a list of PNs where this PE can run. The assignment has to agree with (that is, be a subset of) this list. These constraints are also used to satisfy PEs needed to be assigned to fixed nodes; these will be PEs that started executing in the previous epoch and are still running, but this need not always be the case.

Licensing constraints: Various PEs may run different pieces of software which need licenses. If a PE is assigned to a PN, then all the needed licenses should be present on that PN. There is usually a limit on the number of licenses available for each piece of software, and the assignment respects this limit. These limits on the number of licenses may be defined at the system level (standard licenses) or at the processing node level (node-locked licenses).

Security constraints: Since data processed by the PEs is often confidential (and in particular there are different levels of this confidentiality), there are some natural security and privacy constraints. Security constraints include global and node specific items, and need to be satisfied at all times; i.e., they are temporal.

Memory constraints: The total memory used by PEs assigned to a PN should respect the available memory at that PN.

Distance constraints: No two PEs that communicate are allowed to be "too far" from each other.

Similarity constraints: Certain PEs can only be allocated to similar nodes; these constraints are formulated via a similarity relation for each PE p.

PE parallelism constraints: For each PE, the number of nodes is constrained between some minimum and maximum limits; if the maximum is larger than 1, then the PE can be executed in parallel.

Limited incremental changes: There is overhead involved in preparing a PN for a PE. The solution produced by NCmacroW 152 should not deviate significantly from one macro epoch to another.

At a high level the design of NCmacroW 152 can be summarized as follows: A decision is made for each PE into which of the one or more the processing nodes the PE will be assigned. The NCmacroW problem may be solved by mixed integer linear programming (ILP). ILP is quite accurate and will take into account almost all of the constraints involved. Even though taking all these constraints into account for a problem on a large number of PNs could lead to a huge system of equations, present embodiments are able to solve this efficiently because the embodiments permit some variables to be fractional instead of binary. Greater details on ILP are given later.

The resource requirements of PEs can change dramatically in a short time frame. To handle this, each PE needs to be over-allocated. However, to make sure the system is not under-utilized on average, each PN needs to be overloaded on the system too. Thus, a PE will not be running on all the PNs to which it is assigned. The hope is that if some PE needs more resources than it usually needs, it can be run on the nodes to which it is assigned to by shifting the already running jobs on these nodes to other nodes. This dynamic reallocation of PEs is the job of the micro model. However, for the micro model to be able to do its job properly, the NCmacroW model 152 needs to ensure that the PE to PN assignments are "well-connected".

To summarize, the goal of the ILP is to decide which PE goes to which nodes. Of course such a decision has to take into consideration various constraints such a resource matching, licensing, traffic, processing and so on. Another benefit is that even if the present invention does not solve the problem to optimality, because of time constraints, it can still obtain a lot of information from the approximate solution. The following notation will be used in the formulation.

Basic input data:
P: Set of PEs, indexed by p. These are the PEs in chosen jobs from the NCmacroQ model.
$\Gamma$: Set of the start and completion times of all PEs in P, indexed by t.
$P^t$: Set of all PEs active at time t.
N: Set of processing nodes, indexed by n.
$D^p$: Set of all PEs that communicate with PE p; this includes all PEs derived from the precedence constraints on PE p.
Lstd: Set of licenses for which standard constraints apply.
Lnode: Set of licenses for which node locked constraints apply.
L: Set of licenses, indexed by l. These are the standard and node locked licenses.
$\pi_l$: For a license l this is the subset of PEs which require l.
$m^p$: Minimum number of nodes allowed for PE p.
$M^p$: Maximum number of nodes allowed for PE p.
$\overline{w}pn$: Indicates whether PE p was allocated to PN n in the previous epoch.

Decision variables and other input data: The following notation will be used in the formulation. The primary decision variables are:
wpn: This variable is 1 if PE p is assigned to PN n, and 0 otherwise.
xpn: These are continuous in the range [0,1]. This variable fraction of processing capacity of PN n allocated to PE p.

The following variables are also employed:
z'nl: This variable is 1 if node-locked license l is on PN n at time t, and 0 otherwise
$\Delta$wpn: This is the difference between the value wpn and the (known) value of this variable during the previous macro model epoch $\overline{w}pn$. Note that this is a derived decision variable.
sn: This is the maximum integrity level assigned to node n, a continuous variable.

Additional notation: For a PE p, let $g^p$ denote its mips requirement from NCmacroQ and let $\beta p$ denote the over-allocation factor. For a PN n, let Hn denote processor mips and let $\alpha n$ be the overallocation factor. The output of a resource matcher is described by a variable Apn, which is 1 if PE p can be placed on PN n, and 0 otherwise. Let kpn denote the security risk level of running PE p on PN n. Let cl denote the budget for standard license l. Let $c_l^{node}$ denote the budget for node locked license l. Let R denote the maximum allowable risk in the computer system. Let wlpn denote the weight (cost) of using standard software license l on PN n for PE p. Typically, these will be 1.

Let $w_{l,n}^{node}$ denote the weight (cost) of using node locked software license l on PN n. Let ∈n denote the maximum number of PE to PN reassignments allowed from previous macro epoch. Let ip denote the integrity level of PE p. Let Smax denote the maximum integrity level among all PEs, and $\Delta_n^{sec}$ denote the range of integrity levels allowed on the PN n.

Constraints:

Consistency constraints: xpn≦wpn: PE p can only allocated a fraction of the resources on PN n if PE p is allocated to PN n; i.e., if wpn=1. Resource matching constraints are enforced by wpn≦Apn. Note that resource matching constraints will not be added explicitly. They will be incorporated implicitly by defining only those variables wpn for which Apn=1.

Parallelism constraints: For each PE, these limit the number of nodes assigned to the PE.

$$M^p \geq \sum_n wpn \geq m^p.$$

Processing constraints:

$$\sum_n \min(Hn, g^p)xpn \geq \beta pg^p.$$

For each PE p the total processing allocated is at least βp times its requirement.

$$\sum_p \min(Hn, g^p)xpn \leq anHn.$$

Similarly, for each node, the total mips assigned to it should not exceed αn times its capacity.

Distance constraints: These constraints ensure that PEs that communicate with each other are not too far from each other. For all PEs p and p' that communicate; i.e., for p'∈D$^p$ and nodes n and n' far away: vpn+vp'n'≦1.

Reassignment constraints: The constraints set Δwpn appropriately: Δwpn≦wpn-$\overline{wpn}$ for all p,n; Δwpn≦$\overline{wpn}$-wpn for all p,n.

The following constraints bound the total incremental change.

$$\sum_{p,n} \Delta wpm \leq \varepsilon n.$$

Licensing constraints: There are two types of licenses. The standard license constraint, to be satisfied at all times in Γ, is:

$$\sum_{p \in \pi_j \wedge p \in P_i} \sum_n wlpnxpn \leq cl.$$

There are two node-locked license constraints, to be satisfied at all times in Γ: wpn≦z'nl and $$\sum_n z'nl \leq c_l^{node}.$$

Security constraints: There are two requirements for security constraints: Absolute PE integrity level constraint: For each processing node there can exist minimum and maximum PE integrity level values. All PEs which are chosen by NCmacroW as candidates for that processing node have integrity levels which fall within this range. This constraint is trivially and directly modeled by the resource matching constraints. Global Risk: Assigning a particular PE to a particular processing node incurs a local risk, which can be arbitrary. The sum of all such local risks can be constrained to be less than or equal to a given global security risk limit. This is imposed by the single constraint, to be satisfied at all times in Γ

$$\sum_{p,n} wpnkpn \leq R.$$

Relative PE integrity level constraints: For each PN there are two constraints: ipwpn≧sn-$\Delta_n^{sec}$-Smax(1-wpn) and ipwpn≦sn.

Figure 7:
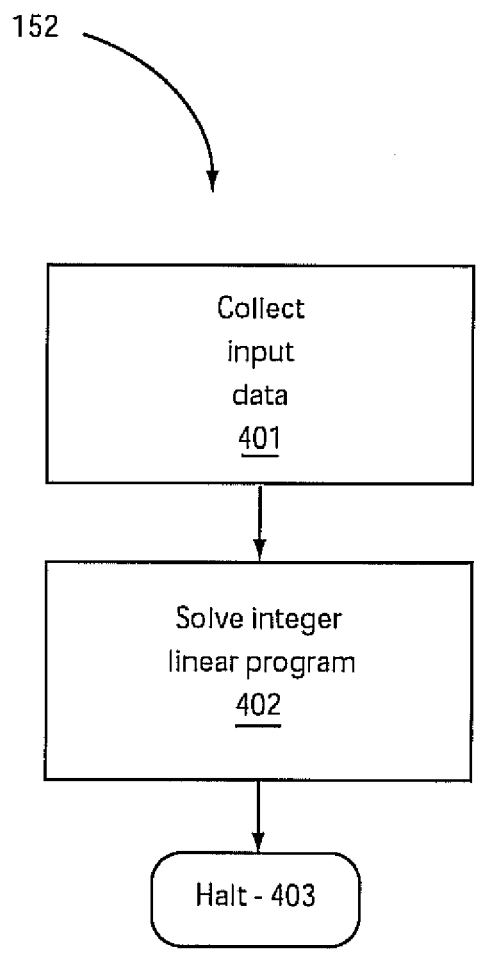
FIG. 7 is a block/flow diagram showing process steps for obtaining a solution for the NCmacroW module in accordance with an illustrative embodiment.

At a high level, the NCmacroW model 152 (FIG. 5) solves one integer linear programs (ILP). Referring to FIG. 7, a flowchart of the main components of the NCmacroW model (152) is illustratively shown. The process begins at block 401, which collects the input data (both from the input module (158 in FIG. 5) and the output of NCmacroQ model 150). Then, block 402 solves the integer linear program (ILP). The process halts at block 403 with a solution to the NCmacroW problem, and sends the results to the output module (160 in FIG. 5).

Figure 8:
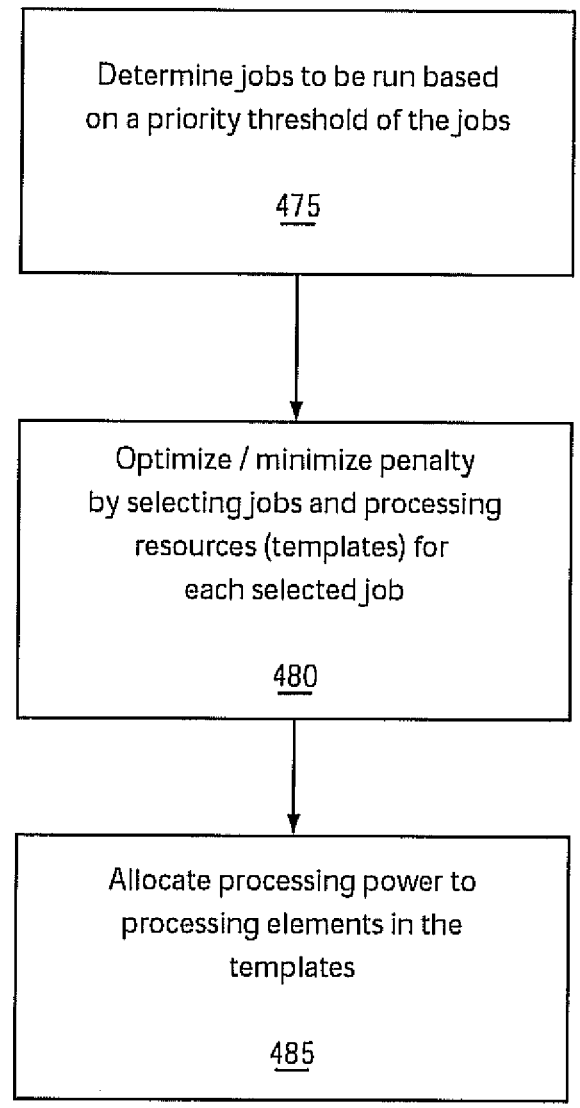
FIG. 8 is a block/flow diagram for a system/method for choosing jobs to run, determining the start time and amount of resources for the PEs of each chosen job, and candidate processing nodes to assign to processing elements to decrease overall penalty in a work scheduling environment.

Referring to FIG. 8, a block/flow diagram is illustratively shown for a system/method of choosing non-continual jobs to run in a stream based distributed computer system. In block 475, determining jobs to be run in a distributed stream-oriented system is performed in accordance with a priority threshold above which jobs will be accepted, below which jobs will be rejected. Projected penalty is optimized by deciding which jobs to run, and by allocating processing resources to each running job in block 480. In block 485, allocating appropriate processing power to processing elements in the templates of the running jobs is performed. The steps in FIG. 8 may be repeated as needed.

Figure 9:
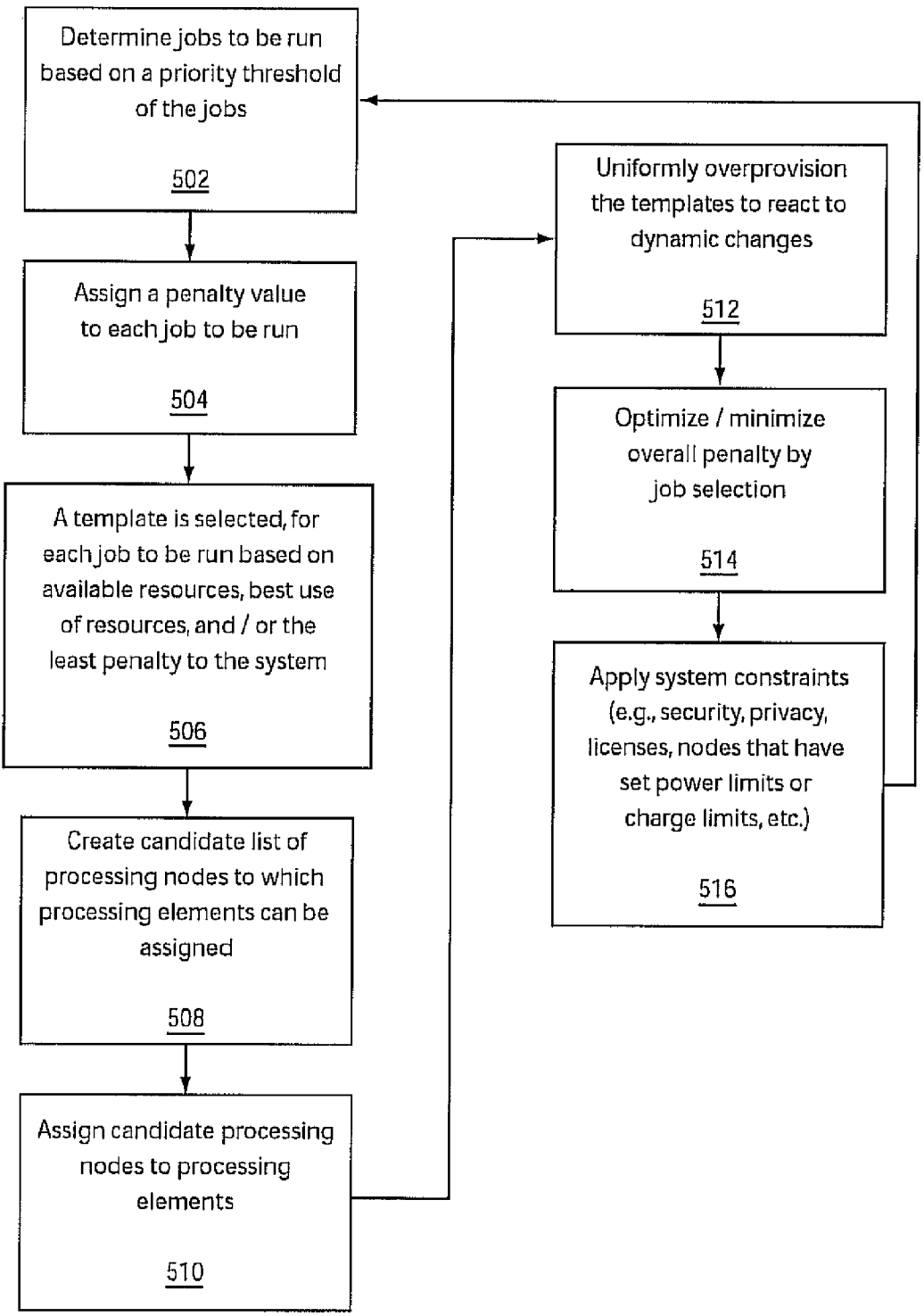
FIG. 9 is a block/flow diagram for a system/method showing greater detail than FIG. 8 for choosing jobs to run, determining start times and amount of resources for the PEs of the chosen jobs, and candidate processing nodes to assign to processing elements to decrease overall penalty in a work scheduling environment.

Referring to FIG. 9, a block/flow diagram is illustratively shown for a more detailed system/method of choosing jobs to run in a stream based distributed computer system. In block 502, jobs to be run are determined in the distributed stream-oriented system. This includes deciding a priority threshold above which jobs will be accepted, below which jobs will be rejected. In block 504, penalty values are assigned to each job based on the penalties of the PEs associated with the job or other criteria. This may performed at any time. In block 506, a template is selected, for each job to be run, from a plurality of alternative templates. The template may be selected by deciding an amount of resources that a job will be permitted to use. The template is selected which best utilizes that amount of resources, and produces the least penalty to the system.

In block 508, a list of candidate processing nodes is determined to handle processing elements for the jobs to be run. In block 510, candidate processing nodes may be assigned to processing elements of the template. Uniform over-provisioning of the template may be performed to react robustly to dynamic changes in importance, jobs, and streams to minimize network utilization among candidate nodes, in block 512. In block 514, overall penalty is optimized/minimized relative to the priority threshold based on penalty values assigned to all jobs by selecting a job set with the smallest penalty. This process is performed throughout the method. In block 516, system constraints are applied to ensure jobs meet set criteria. The constraints may include security, licensing, privacy, limits on candidate processing nodes which cannot be modified, rules for a maximum amount of change permitted to assignments to the candidate processing nodes, and other constraints. These constraints may be applied at various times throughout the method. The steps in FIG. 9 may be repeated as needed.

Having described preferred embodiments of methods and systems for assigning non-continual jobs to candidate processing nodes in a stream-oriented computer system (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for choosing non-continual jobs to run in a stream-based distributed computer system, comprising:
    determining a total amount of processing resources to be consumed by non-continual jobs, based on priorities of both continual and non-continual work;
    determining a priority threshold by incrementally increasing the priority threshold; accepting non-continual jobs to be executed based on the priority threshold, wherein non-continual jobs having a priority higher than the priority threshold will be accepted, and non-continual jobs having a priority lower than the priority threshold will be rejected;
    associating a penalty function with each process element of the accepted non-continual jobs, wherein the penalty function is a non-decreasing objective function with respect to a completion time of the associated process element of the accepted non-continual jobs;
    creating one or more execution templates for each accepted non-continual job, each of the one or more execution templates having different relative start times and resource allocations for the one or more processing elements of each accepted non-continual job;
    forming a system execution template by selecting an execution template and a start time for each of the accepted non-continual jobs, wherein the selected execution template and the start time for each of the accepted non-continual job are selected such that the system execution template minimizes the overall penalties based on estimated completion times of the process elements of the accepted non-continual jobs by minimizing a sum of penalty functions across the processing elements of the accepted non-continual jobs; and
    applying system constraints to the accepted non-continual jobs so that the accepted non-continual jobs meet set criteria such that the accepted non-continual jobs are scheduled to meet the set criteria and minimize overall penalties using the total amount of resources.

2. The method as recited in claim 1, further comprising determining a list of candidate processing nodes to handle tasks for the non-continual jobs to be run.

3. The method as recited in claim 1, further comprising assigning penalties to each non-continual job based on a completion time of the jobs.

4. The method as recited in claim 1, wherein the constraints include at least one of security, licensing and privacy.

5. The method as recited in claim 1, wherein the constraints include at least one of limits on candidate nodes which cannot be modified and rules for a maximum amount of change permitted to assignments to the candidate processing nodes.

6. The method as recited in claim 1, wherein the steps are repeated.

7. The method as recited in claim 1, further comprising:
    uniformly over-provisioning the PEs in the chosen jobs to react robustly to dynamic changes in jobs.

8. The method as recited in claim 1, further comprising scheduling continual and non-continual jobs using a plurality of temporal scales where at a highest temporal scale, jobs that will run, a best template alternative for the jobs that will run, and candidate processing nodes for processing elements of the best template for each running job to minimize penalty of work performed by the system is performed.

9. A computer readable non-transitory storage medium having a computer readable program for choosing non-continual jobs to run in a distributed stream-oriented system, wherein the computer readable program when executed on a computer causes the computer to execute the steps of:
    determining a total amount of processing resources to be consumed by non-continual jobs, based on priorities of both continual and non-continual work;
    determining a priority threshold by incrementally increasing the priority threshold;
    accepting non-continual jobs to be executed based on the priority threshold, wherein non-continual jobs having a priority higher than the priority threshold will be accepted, and non-continual jobs having a priority lower than the priority threshold will be rejected;
    associating a penalty function with each process element of the accepted non-continual jobs, wherein the penalty function is a non-decreasing objective function with respect to a completion time of the associated process element of the accepted non-continual jobs;
    creating one or more execution templates for each accepted non-continual job, each of the one or more execution templates having different relative start times and resource allocations for the one or more processing elements of each accepted non-continual job;
    forming a system execution template by selecting an execution template and a start time for each of the accepted non-continual jobs, wherein the selected execution template and the start time for each of the accepted non-continual job are selected such that the system execution template minimizes the overall penalties based on estimated completion times of the process elements of the accepted non-continual jobs by minimizing a sum of penalty functions across the processing elements of the accepted non-continual jobs; and
    applying system constraints to the accepted non-continual jobs so that the accepted non-continual jobs meet set criteria such that the accepted non-continual jobs are scheduled to meet the set criteria and minimize overall penalties using the total amount of resources.

10. A system for scheduling non-continual application tasks in a distributed computer system, comprising:

a scheduler implemented in a computer usable non-transitory storage medium having a computer readable program configured to schedule work using a non-continual macro method, the scheduler being configured to determine with a processor a total amount of processing resources to be consumed by non-continual jobs based on priorities of both continual and non-continual work, decide which non-continual jobs to be run in a distributed stream-oriented system in accordance with a priority threshold by incrementally increasing the priority threshold, accepting non-continual jobs to be executed based on the priority threshold, wherein non-continual jobs having a priority higher than the priority threshold will be accepted, and non-continual jobs having a priority lower than the priority threshold will be rejected, to associate a penalty function with each process element of the accepted non-continual jobs, wherein the penalty function is a non-decreasing objective function with respect to a completion time of the associated process element of the accepted non-continual jobs, to create one or more execution templates for each accepted non-continual job, each of the one or more execution templates having different relative start times and resource allocations for the one or more processing elements of each accepted non-continual job, the scheduler further configured to form a system execution template by selecting an execution template and a start time for each of the non-continual jobs, wherein the selected execution template and the start time for each of the accepted non-continual jobs are selected such that the system execution template minimizes overall penalties based on estimated completion times of the elements of the accepted non-continual jobs by minimizing a sum of penalty functions across the processing elements of the accepted non-continual jobs;

the non-continual macro method including:

a quantity component configured to minimize penalty by determining accepted jobs to run, a starting time and resources of processing elements, among accepted non-continual running jobs chosen; and a where component configured to allocate resources from processing nodes to the processing elements in the accepted non-continual running jobs.

11. The system as recited in claim 10, wherein the non-continual macro method includes an input module and an output module, and delta models which permit updates and corrections in input data for the quantity and where components.

12. The system as recited in claim 10, wherein the macro method is one of a plurality of temporal scales and occupies a highest temporal scale to determine, jobs that will run, a best template alternative for the jobs that will run, and candidate processing nodes for processing elements of the best template for each running job to minimize penalty of work performed by the system.

13. The system as recited in claim 12, wherein the scheduler fractionally assigns the processing elements in jobs to processing nodes at a next temporal scale having a time scale less than the macro method.

14. The system as recited in claim 10, further comprising a list of candidate processing nodes output from the scheduler to handle tasks for the non-continual jobs to be run.

15. The system as recited in claim 10, wherein each non-continual job includes a penalty value assigned thereto based on a completion time of that job.

16. The system as recited in claim 10, wherein the constraints include at least one of security, licensing and privacy.

17. The system as recited in claim 10, wherein the constraints include at least one of limits on candidate nodes which cannot be modified and rules for a maximum amount of change permitted to assignments to the candidate processing nodes.

18. The system as recited in claim 10, further comprising a resource partitioner configured to partition resources of the system among continual and non-continual jobs.

\* \* \* \* \*